(12) United States Patent
Goto et al.

(10) Patent No.: US 6,427,670 B2
(45) Date of Patent: Aug. 6, 2002

(54) FUEL GAS FEEDING SYSTEM

(75) Inventors: Hiroyuki Goto; Shusuke Akazaki; Hideharu Yamazaki; Yoshihito Sakurai, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/838,184

(22) Filed: Apr. 20, 2001

(30) Foreign Application Priority Data

Apr. 20, 2000 (JP) ........................................ 2000-119465

(51) Int. Cl.$^7$ ................................................ F02B 43/00
(52) U.S. Cl. ................................... 123/529; 123/198 D
(58) Field of Search ........................... 123/529, 198 DB, 123/527, 525, 198 D, 520

(56) References Cited

U.S. PATENT DOCUMENTS

| 5,390,644 | A | * | 2/1995 | Nunogaki et al. | ........... | 123/520 |
| 5,419,299 | A | * | 5/1995 | Fukasawa et al. | ........... | 123/520 |
| 5,441,026 | A | * | 8/1995 | Akimoto | .............. | 123/198 DB |
| 5,632,250 | A | * | 5/1997 | Kato et al. | ................... | 123/490 |
| 6,220,229 | B1 | * | 4/2001 | Kawamura et al. | ......... | 123/520 |

FOREIGN PATENT DOCUMENTS

JP          7-189731          7/1995

* cited by examiner

Primary Examiner—Gene Mancene
Assistant Examiner—Hyder Ali
(74) Attorney, Agent, or Firm—Arent Fox Kintner Plotkin & Kahn, PLLC (57) ABSTRACT

A first cutoff valve 24 and a second cutoff valve 41 are closed in a state in which an internal combustion engine 1 is stopped, and a reducing amount of a pressure P0 in a high pressure passageway 11 after the passage of a predetermined decision time T0 and a reducing amount of a pressure P2 in a low pressure passageway 12 after the passage of a predetermined decision time T2 are measured. When the reducing amount of the first pressure P0 is equal to or larger than a predetermined reducing amount ΔP0, it is decided that a leakage is generated in the high pressure passageway 11. When the reducing amount of the second pressure P2 is equal to or larger than a predetermined reducing amount ΔP2, it is decided that a leakage is generated in the low pressure passageway 12.

8 Claims, 8 Drawing Sheets

FIG. 8 (a) IGSW

FIG. 8 (b) ECU POWER

FIG. 8 (c) FIRST CUTOFF VALVE

FIG. 8 (d) Tf0 TIMER

FIG. 8 (e) P0

FIG. 8 (f) SECOND CUTOFF VALVE

FIG. 8 (g) Tf2 TIMER

FIG. 8 (h) P2

FUEL GAS FEEDING SYSTEM

BACKGROUND OF THE INVENTION

1. Field of the Invention

The present invention relates to a fuel gas feeding system for feeding a fuel gas to an internal combustion engine for burning a fuel gas such as a compressed natural gas.

2. Description of the Related Art

In recent years, a natural gas has been employed as one of alternate fuels for gasoline or gas oil. In the case in which the natural gas is to be used as a fuel of an internal combustion engine for vehicles, a fuel gas feeding system as described in JP-A-7-189731 is used, for example, in which a high pressure cylinder filled with a natural gas compressed to have a pressure of approximately 200 kg/cm² is mounted on a vehicle and the natural gas is fed from the high pressure cylinder to a combustion chamber of the internal combustion engine through a fuel gas feeding passageway, a pressure regulator and a fuel injection valve.

In such a fuel gas feeding system, it is necessary to rapidly detect a situation in which a hole is formed in the fuel gas feeding passageway and a fuel leaks out, thereby taking a countermeasure in an early stage.

SUMMARY OF THE INVENTION

In view of this respect, it is an object of the invention to provide a fuel gas feeding system having a failure diagnosing function capable of rapidly detecting that a leakage is generated in the fuel gas feeding passageway for feeding a fuel gas to an internal combustion engine.

In order to achieve the object, a first aspect of the invention is directed to a fuel gas feeding system having a fuel gas feeding passageway (11, 12) for feeding a fuel gas to an internal combustion engine and a plurality of cutoff valves (24, 41, 7) provided in the middle of the fuel gas feeding passageway, the system comprising a pressure sensor (32, 33) for detecting a pressure in a portion partitioned by adjacent two of the cutoff valves in the fuel gas feeding passageway, an engine stop detecting unit detecting stop of the engine, and a failure detecting unit for closing the two adjacent cutoff valves when the stop of the engine is detected, measuring a reducing amount of a pressure detected by the pressure sensor after a predetermined decision time (T0, T2) passes, and deciding that a leakage is generated between the two adjacent cutoff valves when the reducing amount thus measured is equal to or larger than a predetermined reducing amount (ΔP0, ΔP2).

The "predetermined decision time (T0, T2)" and the "predetermined reducing amount(ΔP0, ΔP2)" are set according to a leakage amount (volume/time) per unit time to be decided as a failure and the volume of the passageway to be decided.

According to such a structure, the adjacent two of the cutoff valves provided in the middle of the fuel gas feeding passageway are closed. Consequently, the reducing amount of the pressure in the closed passageway is measured after the predetermined decision time passes. When the reducing amount thus measured is larger than the predetermined reducing amount, it is decided that a leakage is generated between the two adjacent cutoff valves. Therefore, in the case in which the leakage is generated in the fuel gas feeding passageway, it is possible to rapidly decide which portion partitioned by the cutoff valves provided in the passageway generates the leakage.

A second aspect of the invention is directed to the fuel gas feeding system according to the first aspect of the invention, wherein the fuel gas feeding passageway includes a high pressure passageway (11) partitioned by a first cutoff valve (24) and a second cutoff valve (41) and having a comparatively high pressure of a fuel gas and a low pressure passageway (12) partitioned by the second cutoff valve (41) and a third cutoff valve (7) and having a comparatively low pressure of the fuel gas, a pressure regulator (51, 61) is provided between the low pressure passageway (12) and the second cutoff valve (41), and the failure detecting unit sets the predetermined decision time (T2) required for deciding presence of a leakage in the low pressure passageway (12) depending on a pressure (P0) in the high pressure passageway and a temperature (TG2) of the fuel gas in the low pressure passageway.

According to such a structure, the predetermined decision time required for deciding presence of a leakage in the low pressure passageway is set depending on the pressure in the high pressure passageway and the temperature of the fuel gas in the low pressure passageway. It is considered that a reducing speed of the pressure in the low pressure passageway is reduced due to the leakage if the pressure in the high pressure passageway is high and the temperature of the fuel gas in the low pressure passageway is low. The predetermined decision time is set to be longer when the pressure in the high pressure passageway is increased and the temperature of the fuel gas in the low pressure passageway is dropped. Consequently, the decision can be carried out accurately.

DETAILED DESCRIPTION OF THE PREFERRED EMBODIMENTS

An embodiment of the invention will be described below with reference to the drawings.

Figure 1:
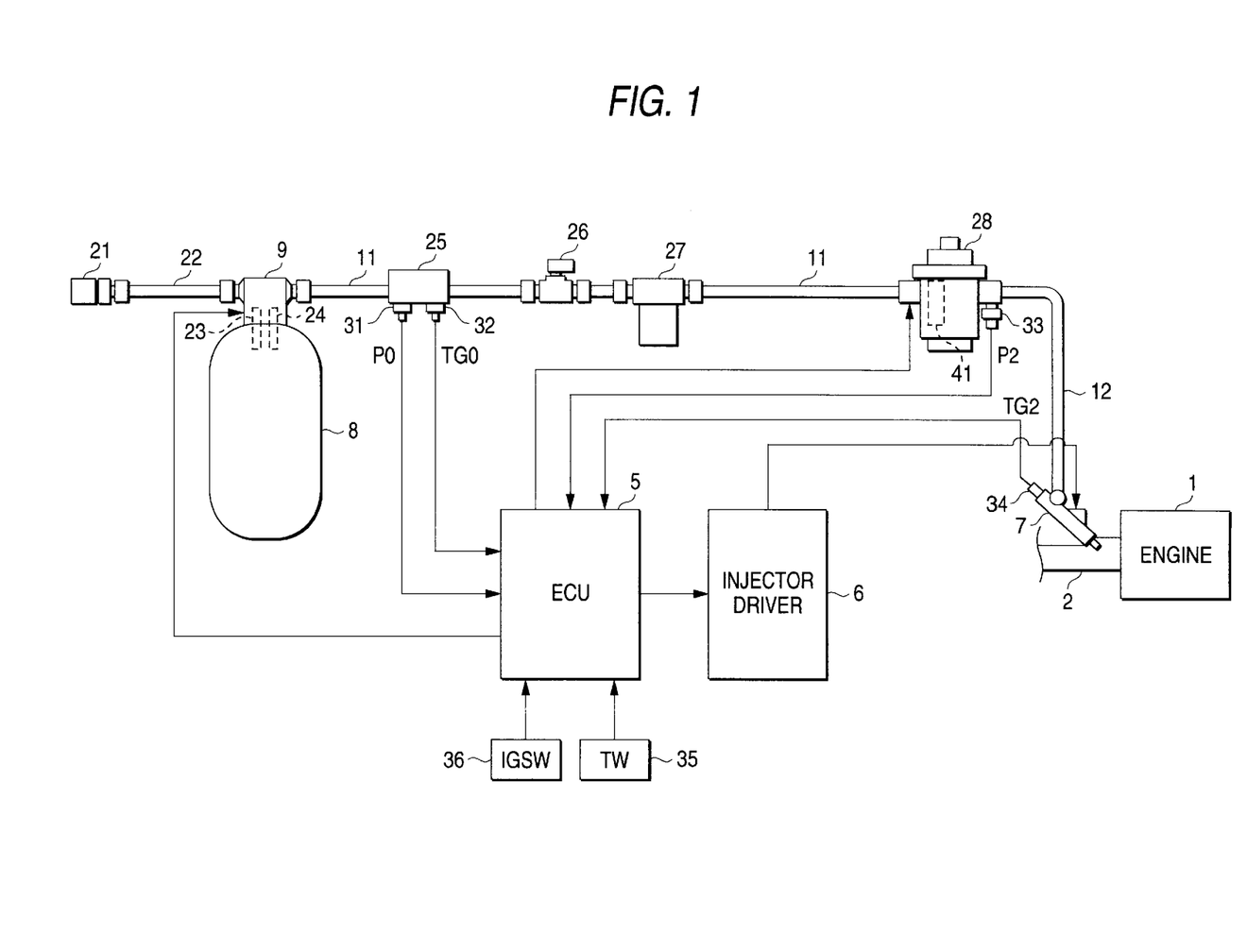
FIG. 1 is a view showing the structure of a fuel gas feeding system according to an embodiment of the invention.

FIG. 1 is a view showing the structure of a fuel gas feeding system according to the embodiment of the invention. The system is mounted on a rear part of a vehicle, and a compressed natural gas (CNG) is fed as a fuel gas from a CNG tank 8 filled with the compressed natural gas to an intake port 2 of an internal combustion engine (hereinafter referred to as an "engine") 1 mounted on a front part of the vehicle.

A filling passageway 22 and a high pressure passageway 11 having a comparatively high gas pressure are connected to the CNG tank 8 through a connecting unit 9, and a filling port 21 is provided in the filling passageway 22. The connecting unit 9 includes a check valve 23 provided between the filling passageway 22 and the CNG tank 8 and a first cutoff valve 24 provided between the high pressure passageway 11 and the CNG tank 8.

The check valve 23 is provided to prevent the natural gas from reversely flowing from the CNG tank 8 to the filling passageway 22. Moreover, the first cutoff valve 24 is an electromagnetic valve which is connected to an electronic control unit (hereinafter referred to as an "ECU") 5 and of which opening operation is controlled by the ECU 5.

The high pressure passageway 11 is provided with a joint box 25, a manual ON-OFF valve 26 and a filter 27 from the upstream side in order and is connected to a low pressure passageway 12 having a comparatively low gas pressure through a pressure control unit 28. The low pressure passageway 12 is connected to a fuel injection valve 7 for injecting a fuel gas into the intake port 2. The fuel injection valve (injector) 7 is connected to an injector driver 6, the injector driver 6 is connected to the ECU 5, and the ECU 5 controls a period required for fuel injection and a time for fuel injection through the fuel injection valve 7. The fuel injection valve 7 is provided on the intake port for each cylinder of the engine 1.

The joint box 25 is provided with a first pressure sensor 31 for detecting a pressure P0 (hereinafter referred to as a "first pressure P0") in the high pressure passageway 11 and a first gas temperature sensor 32 for detecting a fuel gas temperature TG0 in the high pressure passageway 11. The detection signals of the sensors 31, 32 are input to the ECU 5.

The manual ON-OFF valve 26 can be opened manually, and is usually held in an open state. Moreover, the filter 27 is provided for removing dust contained in a fuel gas.

A second pressure sensor 33 for detecting a pressure P2 (hereinafter referred to as a "second pressure P2") in the low pressure passageway 12 is provided in the vicinity of the outlet of the pressure control unit 28, and furthermore, a second gas temperature sensor 34 for detecting a fuel gas temperature TG2 in the low pressure passageway 12 is provided in the fuel injection valve 7.

Figure 2:
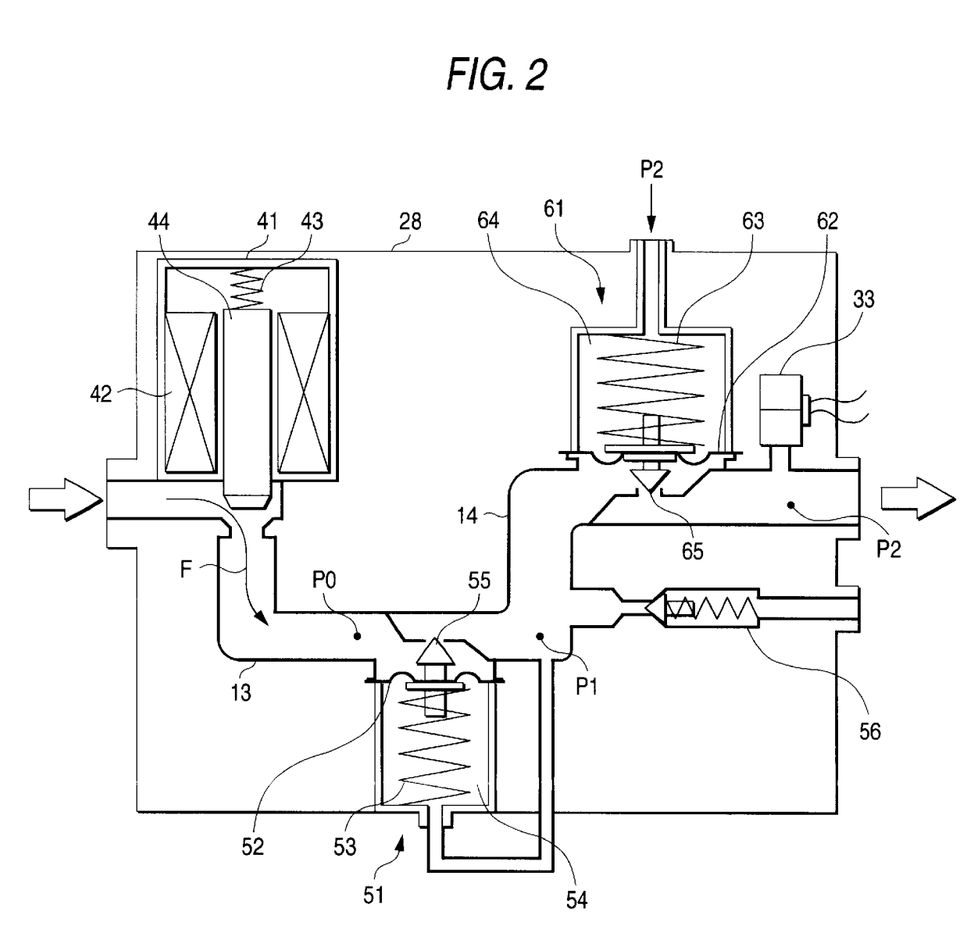
FIG. 2 is atypical view showing the structure of a pressure control unit illustrated in FIG. 1.

FIG. 2 is a typical view illustrating the structure of the pressure control unit 28. The pressure control unit 28 includes a second cutoff valve 41, a primary pressure reducing valve 51, a safety valve 56, and a secondary pressure reducing valve 61. The second cutoff valve 41 is an electromagnetic valve in which a valve element 44 is urged in a closing direction through a spring 43 and is conducted to a solenoid 42 so as to open the valve, and the solenoid 42 is connected to the ECU 5. Accordingly, the second cutoff valve 41 is opened or closed under control of the ECU 5. When the second cutoff valve 41 is opened, a fuel gas flows into a pressure chamber 13 as shown in an arrow F.

The primary pressure reducing valve 51 includes a diaphragm 52 having a valve element 55 fixed thereto, a pressure regulating spring 53 and a back pressure chamber 54. The back pressure chamber 54 communicates with an intermediate pressure chamber 14. A pressure P1 in the intermediate pressure chamber 14 (hereinafter referred to as an "intermediate pressure P1") is an intermediate pressure between the first pressure P0 and the second pressure P2 (P0<P1<P2). The primary pressure reducing valve 51 is opened (an opening is increased) when the intermediate pressure P1 is lower than a set pressure, while the primary pressure reducing valve 51 is closed (the opening is decreased) when the intermediate pressure P1 is higher than the set pressure. Consequently, the intermediate pressure P1 is held to be almost equal to the set pressure. In the embodiment, the first pressure P0 is 10 to 260 kg/cm$^2$, and the set pressure of the intermediate pressure P1 is approximately 6 kg/cm$^2$.

The safety valve 56 is opened when the intermediate pressure P1 is too raised. Thus, the secondary pressure reducing valve 61 and the low pressure passageway 12 are protected.

The secondary pressure reducing valve 61 is constituted in the same manner as the primary pressure reducing valve 51, and includes a diaphragm 62 having a valve element 65 fixed thereto, a pressure regulating spring 63 and a back pressure chamber 64. A pressure in the low pressure passageway, that is, the second pressure P2 is fed to the back pressure chamber 64. The second pressure P2 is held to be a set pressure (for example, 2.6 kg/cm$^2$) through the secondary pressure reducing valve 61.

Returning to FIG. 1, an engine coolant temperature sensor for detecting a coolant temperature (hereinafter referred to as an "engine coolant temperature") TW of the engine 1 is connected to the ECU 5, and a detection signal thereof is supplied to the ECU 5. Moreover, an ignition switch 36 is connected to the ECU 5, and a signal indicative of ON/OFF of the ignition switch 36 is supplied to the ECU 5.

The ECU 5 serves to control a period required for fuel injection and a time for fuel injection through the fuel injection valve 7 in response to signals output from various sensors shown in FIG. 1 and other sensors which are not shown, and to carry out a failure diagnosis which will be described below, that is, to decide the presence of a leakage in the high pressure passageway 11 and the low pressure passageway 12.

Figure 3:
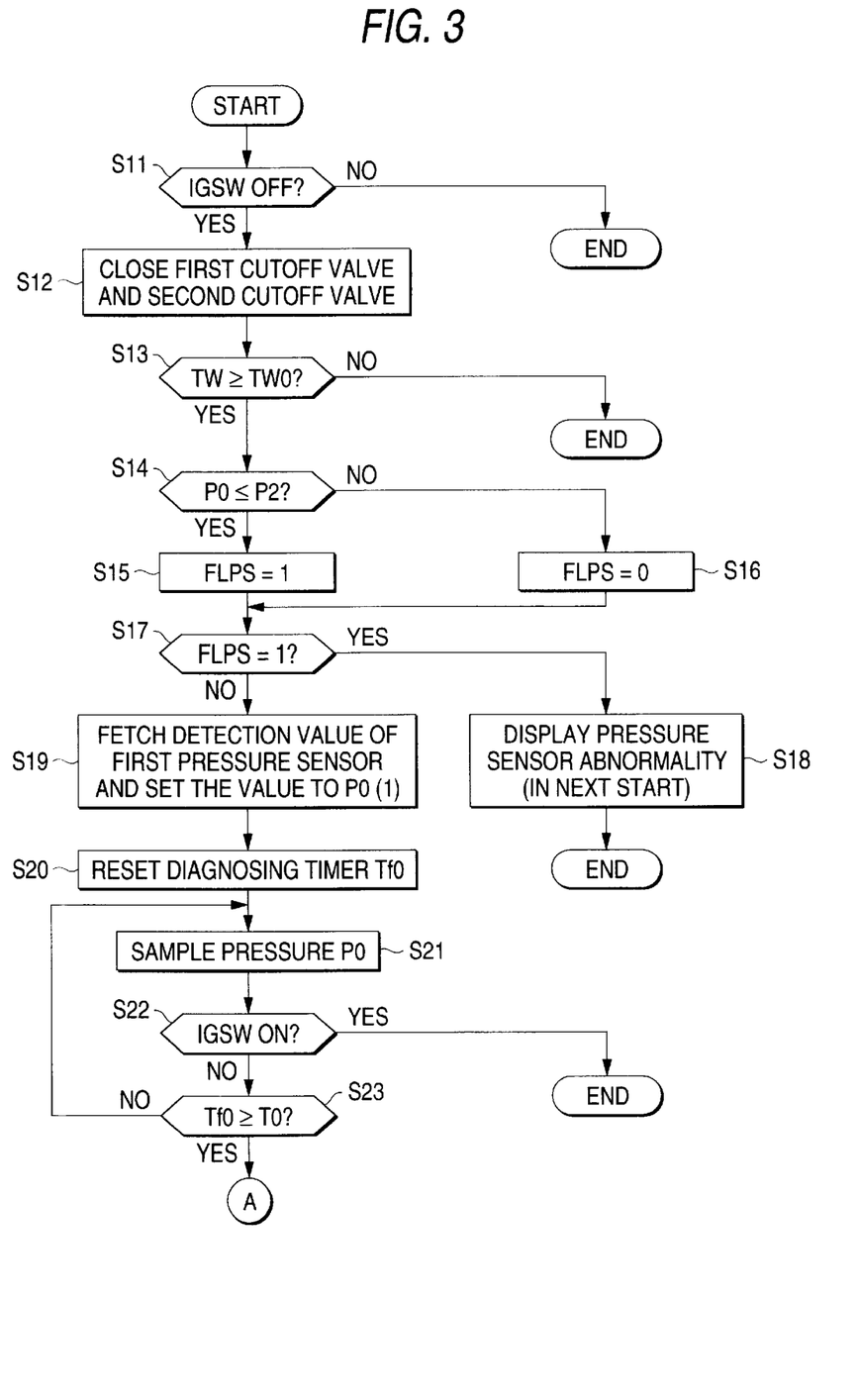
FIG. 3 is a flow chart showing a failure diagnosis processing for a high pressure passageway.
Figure 4:
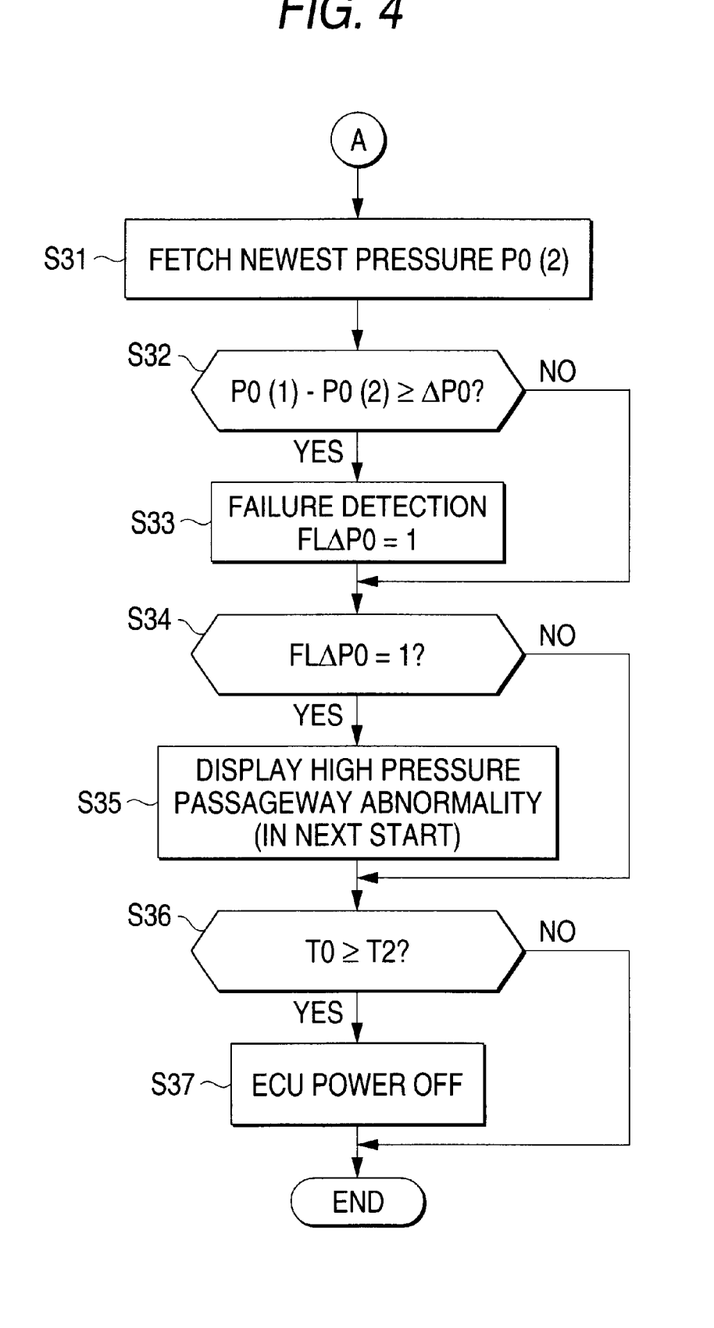
FIG. 4 is a flow chart showing the failure diagnosis processing for the high pressure passageway.

FIGS. 3 and 4 are flow charts showing a processing for deciding the presence of the leakage in the high pressure passageway 11 partitioned by the first cutoff valve 24 and the second cutoff valve 41. The processing is executed every constant time in the ECU 5.

At a step S11, it is decided whether the ignition switch 36 is turned OFF or not. When the ignition switch 36 is not turned OFF, the processing is ended immediately. When the ignition switch 36 is turned OFF, the first cutoff valve 24 and the second cutoff valve 41 are closed (step S12) and it is decided whether or not the engine coolant temperature TW is equal to or higher than a predetermined coolant temperature TW0 (for example, 85° C.) (step S13). When the warming up of the engine is not completed with TW<TW0, the temperatures of the fuel gas passageways 11 and 12 and other fuel feeding system parts are indefinite. Therefore, there is a possibility that precision in the decision might be deteriorated. Consequently, the processing is ended immediately. When TW>TW0 is obtained, it is decided whether or not the first pressure P0 is equal to or lower than the second pressure P2 (step S14). Usually, since the answer is "NO", a pressure sensor abnormality flag FLPS indicating the abnormality of the pressure sensor as "1" is set to "0" (step S16) and the processing proceeds to a step S17. On the other hand, when the answer of the step S14 is "YES", it is decided that the first pressure sensor 31 or the second pressure sensor 33 is abnormal and the pressure sensor abnormality flag FLPS is set to "1" (step S15) and the processing proceeds to the step S17.

At the step S17, it is decided whether the pressure sensor abnormality flag FLPS is "1" or not. When FLPS=1 is obtained, pressure sensor abnormality display is performed at the time of the next start of the engine (step S18) and the processing is ended immediately. The pressure sensor abnormality display is performed by turning ON an alarm lamp, for example.

When the pressure sensor is not abnormal with FLPS=0 at the step S17, the detection value of the first pressure sensor 31 is fetched and is stored as a first detection value P0(1) (step S19). Next, the value of a diagnosing timer Tf0 being an up count timer is reset to "0" (step S20) and steps S21 to S23 are executed. More specifically, the first pressure sensor output P0 is sampled (step S21) and it is decided whether or not the ignition switch 36 is turned ON (step S22). When the ignition switch is continuously set in the OFF state, it is decided whether or not the value of the diagnosing timer Tf0 is equal to or greater than a first predetermined decision time T0 (step S23). If Tf0<T0 is obtained, the processing returns to the step S21. When the ignition switch 36 is turned ON before Tf0≧T0 is obtained, the processing is ended immediately (step S22).

When the answer of the step S23 is "YES", the processing proceeds to a step S31 (FIG. 4) where the newest sampling value is stored as a second detection value P0(2), and it is decided whether or not a differential pressure (=P0(1)–P0(2)) between the first detection value P0(1) and the second detection value P0(2), that is, the reducing amount of the first pressure P0 after the first predetermined decision time T0 passes since the first cutoff valve 24 and the second cutoff valve 41 have been closed, is equal to or larger than a predetermined reducing amount ΔP0 (step S32). As a result, when P0(1)–P0(2)<ΔP0 is obtained, it is decided that there is no failure and the processing immediately proceeds to a step S34. When P0(1)–P0(2)≧ΔP0 is obtained, it is decided that there is a leakage in the high pressure passageway 11 and the first failure detecting flag FLΔP0 indicating the presence of the leakage as "1" is set to "1" (step S33) and the processing proceeds to a step S34.

At the step S34, it is decided whether the first failure detecting flag FLΔP0 is "1" or not. When FLΔP0=1 is obtained, high pressure passageway abnormality display indicating that the high pressure passageway 11 has an abnormality is performed at the time of the next start of the engine (step S35) Moreover, when FLΔP0=0 is obtained, the processing immediately proceeds to a step S36. The high pressure passageway abnormality display is performed by turning ON the alarm lamp, for example.

At the step S36, it is decided whether or not the first predetermined decision time T0 is equal to or greater than a second predetermined decision time T2 to be used for the failure diagnosis of the low pressure passageway 12 which will be described below. When T0–T2 is obtained, the power source of the ECU 5 is turned OFF (step S37). When T0<T2 is obtained, the processing is immediately ended.

When T0≧T2 is obtained at the steps S36 and S37, the failure diagnosis of the low pressure passageway 12 has already been ended or is ended at the same time. Therefore, it is not necessary to turn ON the power source of the ECU 5. For this reason, the steps S36 and S37 are provided to be ended by turning OFF the power source.

Figure 5:
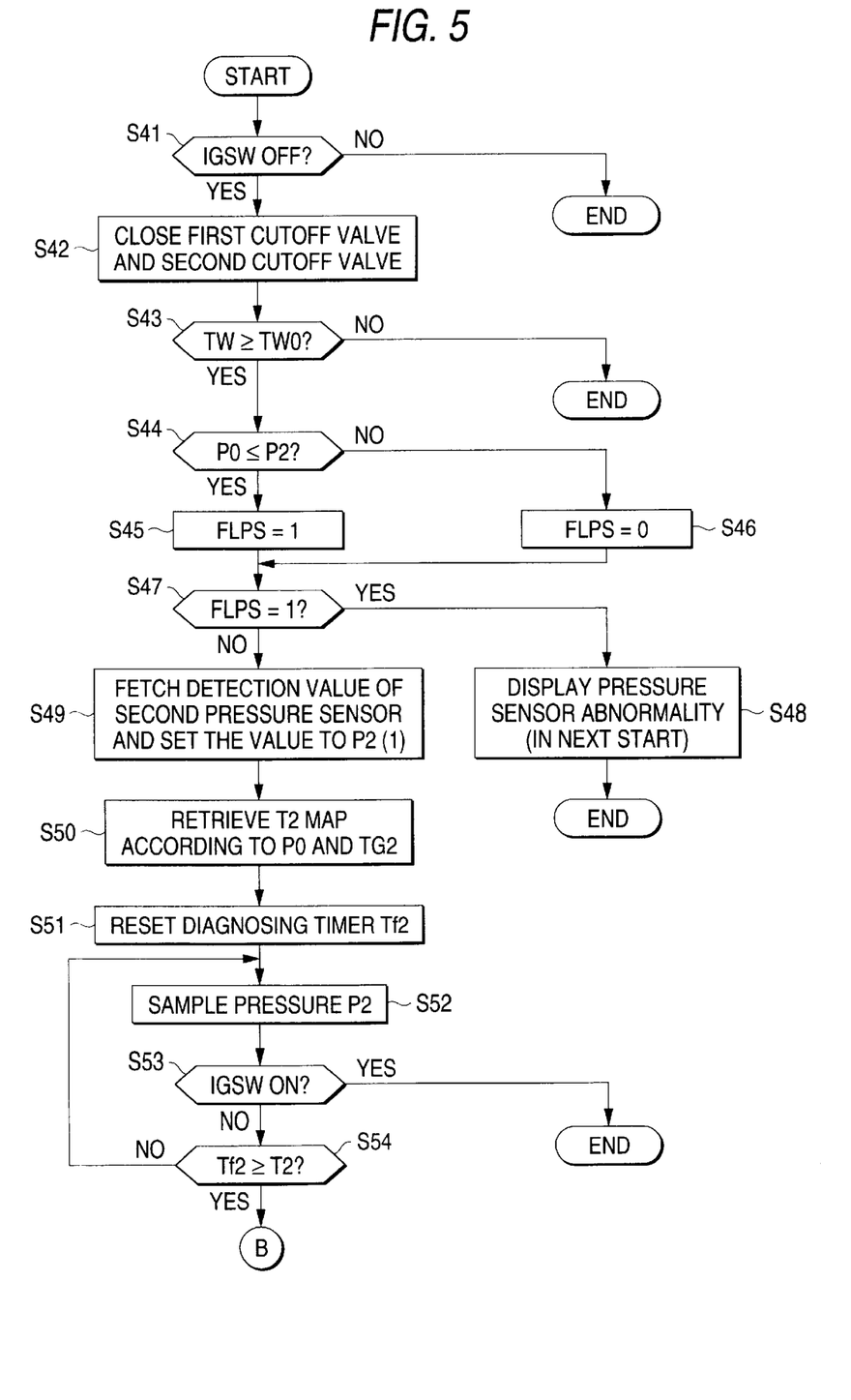
FIG. 5 is a flow chart showing a failure diagnosis processing for a low pressure passageway.
Figure 6:
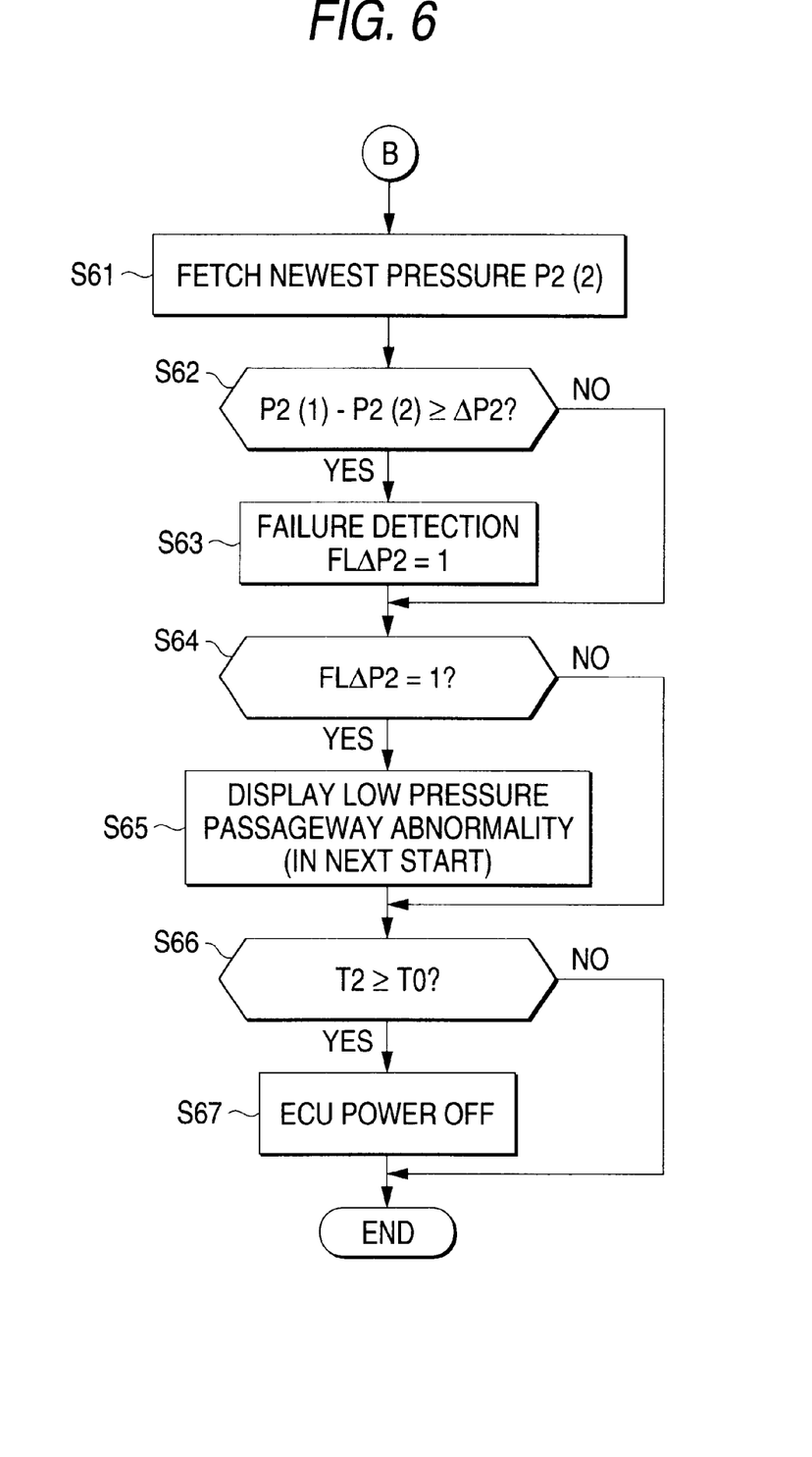
FIG. 6 is a flow chart showing the failure diagnosis processing for the low pressure passageway.

FIGS. 5 and 6 are flow charts showing a processing for deciding the presence of a leakage in the low pressure passageway 12 partitioned by the second cutoff valve 41 and the fuel injection valve 7. This processing is executed every constant time in the ECU 5. In the embodiment, the fuel injection valve 7 corresponds to a third cutoff valve and the fuel injection valve 7 is maintained in a closing state during the stop of the engine.

Figure 7:
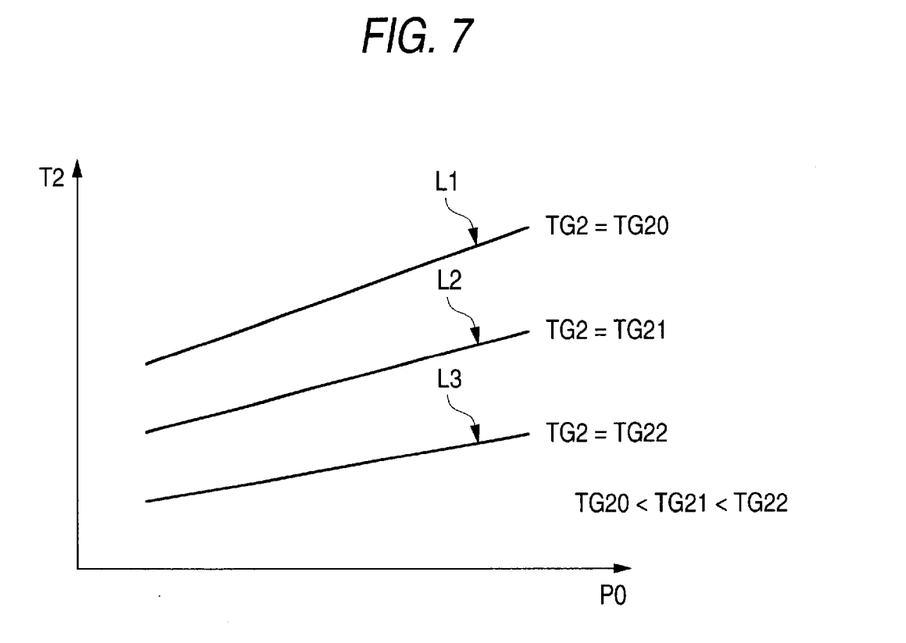
FIG. 7 is a chart showing a map to be used for the processing of FIG. 5, and FIGS. 8(a) to 8(h) are time charts illustrating the failure diagnosis processing shown in FIGS. 3 to 6.

The processings of steps S41 to S48 in FIG. 5 are identical to the processings of the steps S11 to S18 in FIG. 3. At a step S49 in FIG. 5, the detection value of the second pressure sensor 33 is fetched and stored as a first detection value P2(1). Next, a T2 map shown in FIG. 7 is retrieved according to the first pressure P0 and a second fuel gas temperature TG2, and the second predetermined decision time T2 is calculated (step S50). In FIG. 7, straight lines L1, L2 and L3 show the relationship between the first pressure P0 and the second predetermined decision time T2 at the second fuel gas temperature TG2=TG20, TG21 and TG22, which have the relationship of TG20<TG21<TG22. More specifically, the T2 map is set such that the second predetermined decision time T2 is prolonged if the first pressure P0 is high and the second fuel gas temperature T2 is low.

Even if the second cutoff valve 41 is closed, a fuel gas having a high pressure remains in pressure chambers 13 and 14 of the pressure control unit 28. Therefore, the pressure P2 in the low pressure passageway 12 is not dropped in a short time even if there is a leakage. If the first pressure P0 is high, it is necessary to take a longer time for dropping the second pressure P2 by a predetermined reducing amount of A P2 as a threshold for a decision (see a step S62 which will be described below). Moreover, if the fuel gas temperature TG2 is low, the value of the second pressure P2 is reduced (because of a constant volume). Therefore, the reducing amount per unit time of the second pressure P2 is also reduced. By setting the second predetermined decision time T2 using the T2 map shown in FIG. 7, therefore, the presence of a leakage can be decided accurately.

At a step S51 in FIG. 5, the value of a diagnosing timer Tf2 to be an up count timer is reset to "0" and steps S52 to S54 are executed. More specifically, the second pressure sensor output P2 is sampled (step S52) and it is decided whether or not the ignition switch 36 is turned ON (step S53). When the ignition switch is continuously maintained in the OFF state, it is decided whether or not the value of the diagnosing timer Tf2 is equal to or greater than the second predetermined decision time T2 (step S54). If Tf2<T2 is obtained, the processing returns to the step S52. When the ignition switch 36 is turned ON before Tf2≧T2 is obtained, the processing is ended immediately (step S53).

When the answer of the step S54 is "YES", the processing proceeds to a step S61 (FIG. 6) where the newest sampling value is stored as a second detection value P2(2), and it is decided whether or not a differential pressure (=P2(1)–P2(2)) between the first detection value P2(1) and the second detection value P2(2), that is, the reducing amount of the second pressure P2 after the second predetermined decision time T2 passes since the second cutoff valve has been closed, is equal to or larger than a predetermined reducing amount ΔP2 (step S62). As a result, when P2(1)–P2(2)<ΔP2 is obtained, it is decided that there is no failure and the processing immediately proceeds to a step S64. When P2(1)–P2(2)≧ΔP2 is obtained, it is decided that there is a leakage in the low pressure passageway 12 and the second failure detecting flag FLΔP2 indicating the presence of the leakage as "1" is set to "1" (step S63) and the processing proceeds to a step S64.

At the step S64, it is decided whether or not the second failure detecting flag FLΔP2 is "1". When FLΔP2=1 is obtained, a low pressure passageway abnormality display indicating that the low pressure passageway 12 has an abnormality is performed at the time of the next start of the engine (step S65). Moreover, when FLΔP2 =0 is obtained, the processing immediately proceeds to a step S66. The low pressure passageway abnormality display is performed by turning ON the alarm lamp, for example.

At the step S66, it is decided whether or not the second predetermined decision time T2 is equal to or greater than the first predetermined decision time T0. When T2≧T0 is obtained, the power source of the ECU 5 is turned OFF (step S67). When T2<T0 is obtained, the processing is immediately ended.

FIGS. 8(a) to 8(f) are time charts illustrating a failure diagnosing method through the processings of FIGS. 3 to 6. When the ignition switch 36 is turned OFF at a time t0 (FIG. 8(a)), the first cutoff valve 24 and the second cutoff valve 41 are closed and the operations of the diagnosing timers Tf0 and Tf2 are started (FIGS. 8(c), (d), (f) and (g)).

Figure 8:
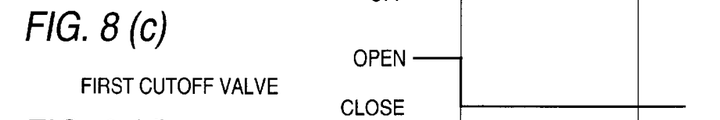

The first pressure P0 and the second pressure P2 which are detected by the pressure sensor are dropped little by little with the passage of a time as shown in a solid line of FIGS. 8(e) and (h) also in a normal state. However, if there is a leakage, the pressures are greatly dropped as shown in a broken line in FIGS. 8(e) and (h). FIGS. 8(a) to 8(h) show an example of T0>T2. When the second predetermined decision time T2 passes to reach the time t1, the decision of leakage is performed by comparing the reducing amount (=P2(1)–P2(2)) with the predetermined reducing amount ΔP2 and the operation of the diagnosing timer Tf2 is stopped. When the reducing amount is equal to or larger than the predetermined reducing amount ΔP2, it is decided that there is a leakage in the low pressure passageway 12.

When the first predetermined decision time T0 passes from the time t0 and reaches a time t2, the decision is performed by comparing the reducing amount (=P0(1)–P0(2)) with the predetermined reducing amount ΔP0 and the operation of the diagnosing timer Tf0 is stopped. When the reducing amount is equal to or larger than the predetermined reducing amount A P0, it is decided that there is a leakage in the high pressure passageway 11.

In the embodiment, as described above, in the state in which the ignition switch 36 is turned OFF and the engine 1 is stopped, the first cutoff valve 24 and the second cutoff valve 41 are closed, and the reducing amount of the pressure P0 in the high pressure passageway 11 after the passage of the predetermined decision time T0 and the reducing amount of the pressure P2 in the low pressure passageway 12 after the passage of the predetermined decision time T2 are measured. When the reducing amount of the first pressure P0 is equal to or larger than the predetermined reducing amount ΔP0, it is decided that there is a leakage in the high pressure passageway 11. When the reducing amount of the second pressure P2 is equal to or larger than the predetermined reducing amount ΔP2, it is decided that there is a leakage in the low pressure passageway 12. Therefore, in the case in which the leakage is generated in the fuel gas feeding passageway for feeding a fuel gas from the CNG tank 8 to the engine 1, it is possible to rapidly decide which portion partitioned by the first and second cutoff valves 24 and 41 and the fuel injection valve 7 to be the third cutoff valve generates the leakage.

Moreover, the predetermined decision time T2 to be used for the failure diagnosis on the low pressure passageway 12 side is set to be longer if the pressure P0 in the high pressure passageway 11 is high, or if the fuel gas temperature TG2 in the low pressure passageway 12 is dropped. Therefore, the decision can be performed accurately except for the influence of a high pressure fuel gas remaining in the pressure control unit 28 and the influence of the fuel gas temperature TG2 also after the second cutoff valve 41 is closed.

In the embodiment, the ECU 5 constitutes the engine stop detecting unit and the failure detecting unit. More specifically, the step S11 in FIG. 3 or the step S41 in FIG. 5 corresponds to the engine stop detecting unit and the steps S12 to S23 in FIG. 3 and the steps S31 to S33 in FIG. 4 or the steps S42 to S54 in FIG. 5 and the steps S61 to S63 in FIG. 6 correspond to the failure detecting unit. Moreover, the high pressure passageway 11 and the low pressure passageway 12 correspond to the "fuel gas feeding passageway". Further, the first cutoff valve 24 and second cutoff valve 41, and the second cutoff valve 41 and fuel injection valve 7 correspond to the "two adjacent cutoff valves", respectively. Furthermore, the primary pressure reducing valve 51 and the second pressure reducing valve 61 correspond to the "pressure regulators".

The invention is not restricted to the embodiment but various modifications can be made. For example, while the example in which the fuel injection valve 7 acts as the third cutoff valve and three cutoff valves are therefore provided has been described in the embodiment, the number of the cutoff valves is not limited to three but may be two or four or more. In that case, the number of the pressure sensors may be smaller than that of the cutoff valves by one.

While the example in which the fuel gas is a natural gas has been described in the embodiment, a hydrogen gas or a coal gas may be used.

While the decision of the leakage in the high pressure passageway 11 and that of the leakage in the low pressure passageway 12 do not always need to be performed at the same time, it is preferable that they should be executed simultaneously because a time required for the failure diagnosis can be wholly shortened.

According to the first aspect of the invention, as described above in detail, the adjacent two of the cutoff valves provided in the middle of the fuel gas feeding passageway are closed. Consequently, the reducing amount of the pressure in the closed passageway is measured after the predetermined decision time passes. When the reducing amount thus measured is larger than a predetermined reducing amount, it is decided that a leakage is generated between the two adjacent cutoff valves. Therefore, in the case in which the leakage is generated in the fuel gas feeding passageway, it is possible to rapidly decide which portion partitioned by the cutoff valves provided in the passageway generates the leakage.

According to the second aspect of the invention, the predetermined decision time required for deciding presence of a leakage in the low pressure passageway is set depending on the pressure in the high pressure passageway and the temperature of the fuel gas in the low pressure passageway. It is considered that a reducing speed of the pressure in the low pressure passageway is reduced due to the leakage if the pressure in the high pressure passageway is high and the temperature of the fuel gas in the low pressure passageway is low. The predetermined decision time is set to be longer when the pressure in the high pressure passageway is increased or the temperature of the fuel gas in the low pressure passageway is dropped. Consequently, the decision can be carried out accurately.

What is claims is:

1. A fuel gas feeding system comprising:
    a fuel gas feeding passageway for feeding a fuel gas to an internal combustion engine, wherein a downstream end of the gad fuel feeding passageway is connected to a fuel injection valve;
    a plurality of cutoff valves provided along the fuel gas feeding passageway;
    a pressure sensor for detecting a pressure of the fuel gas in a portion of the fuel gas passageway partitioned by adjacent two of the cutoff valves in the fuel gas feeding passageway;

an engine stop detecting unit detecting stop of the engine; and a failure detecting unit closing the two adjacent cutoff valves when the stop of the engine is detected, measuring a reducing amount of a pressure detected by the pressure sensor after a predetermined decision time passes, and deciding that a leakage is generated between the two adjacent cutoff valves when the reducing amount thus measured is equal to or larger than a predetermined reducing amount.

2. The fuel gas feeding system according to claim 1, wherein the fuel gas feeding passageway includes a high pressure passageway partitioned by a first cutoff valve and a second cutoff valve and having a comparatively high pressure of a fuel gas, and a low pressure passageway partitioned by the second cutoff valve and a third cutoff valve and having a comparatively low pressure of the fuel gas, a pressure regulator is provided between the low pressure passageway and the second cutoff valve, and the failure detecting unit sets the predetermined decision time required for deciding presence of a leakage in the low pressure passageway depending on a pressure in the high pressure passageway and a temperature of the fuel gas in the low pressure passageway.

3. The fuel gas feeding system according to claim 2, wherein the third cutoff valve is a fuel injection valve.

4. The fuel gas feeding system according to claim 1, further comprising:

an engine coolant temperature sensor detecting a cool ant temperature of the engine, wherein, when the coolant temperature is lower than a predetermined coolant temperature, the processing of the failure detecting unit is stopped.

5. The fuel gas feeding system according to claim 1, wherein the failure detecting unit detects leakage of the fuel gas passageway closed by adjacent cutoff valves when the internal combustion engine is detected as being stopped.

6. The fuel gas feeding system according to claim 2, wherein the pressure regulator is a primary pressure regulator provided in a pressure control unit having a cutoff valve upstream of the primary pressure regulator relative to a pressure chamber.

7. The fuel gas feeding system according to claim 6, further comprising a secondary pressure regulator downstream of the primary pressure regulator relative to the pressure chamber.

8. The fuel gas feeding system according to claim 7, further comprising a safety valve intermediate of the primary and secondary pressure regulators.

* * * * *